June 12, 1923.

J. L. FERRIS

THERMOSTATIC VALVE

Filed April 18, 1922

Inventor:
Jesse L. Ferris,
by Spear Middleton Donaldson & Hall
Attys.

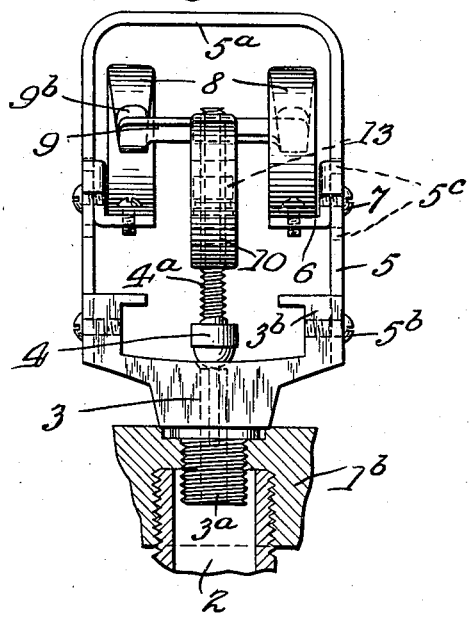
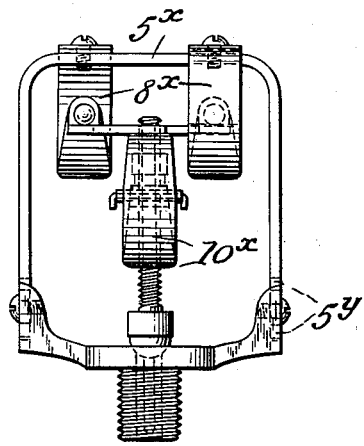
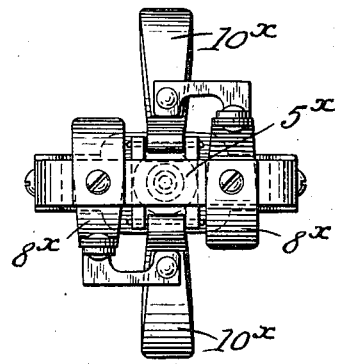

Patented June 12, 1923.

1,458,813

UNITED STATES PATENT OFFICE.

JESSE L. FERRIS, OF FORT DODGE, IOWA.

THERMOSTATIC VALVE.

Application filed April 18, 1922. Serial No. 554,619.

*To all whom it may concern:*

Be it known that I, JESSE L. FERRIS, a citizen of the United States, and resident of Fort Dodge, in the county of Webster, in the State of Iowa, have invented certain new and useful Improvements in Thermostatic Valves, of which the following is a specification.

My present invention relates to improvements in automatic valves designed to control the flow of steam through radiators and hence to automatically regulate the action thereof.

The invention aims to provide a simple form of device which may be easily and economically manufactured, may be readily applied to any ordinary valve casing, which may be easily and accurately adjusted to any desired steam pressure or temperature, and which after adjustment will be proof against being tampered with by unauthorized persons.

The invention further aims to provide a construction which will be capable of a wider range of adjustment than with previous devices of which I am aware, thereby adapting it for greater variations in temperature, which will give greater pressure in the seating of the valve, and which will nevertheless insure the valve moving in a rectilinear path and in alignment with the valve seat.

With these and other objects in view, the invention includes the novel construction and arrangement and combination of parts hereinafter described and particularly defined by the appended claims, reference being had to the accompanying drawings in which:—

Fig. 3 is a view of the thermostatic member taken at right angles to Fig. 1.

Figure 4:
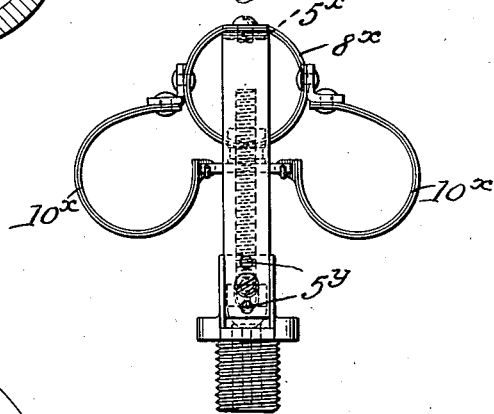
Figure 2:
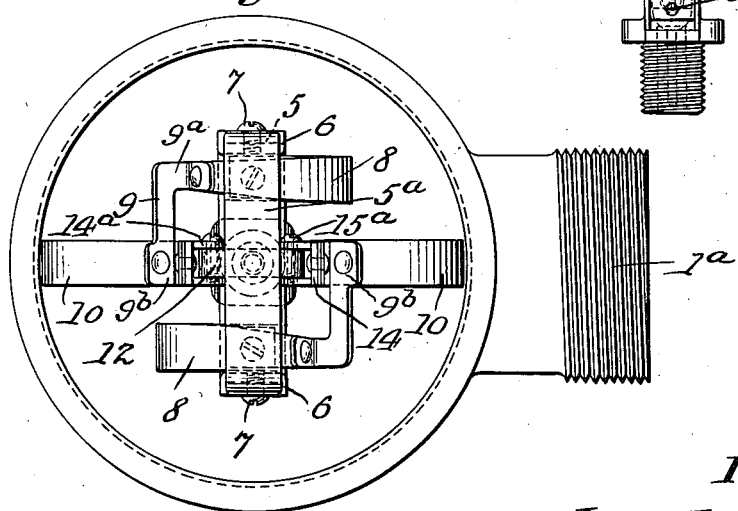
Fig. 2 is a plan view with the cover of the casing removed.

Figs. 4, 5, and 6 are views of a modification.

Figure 1:
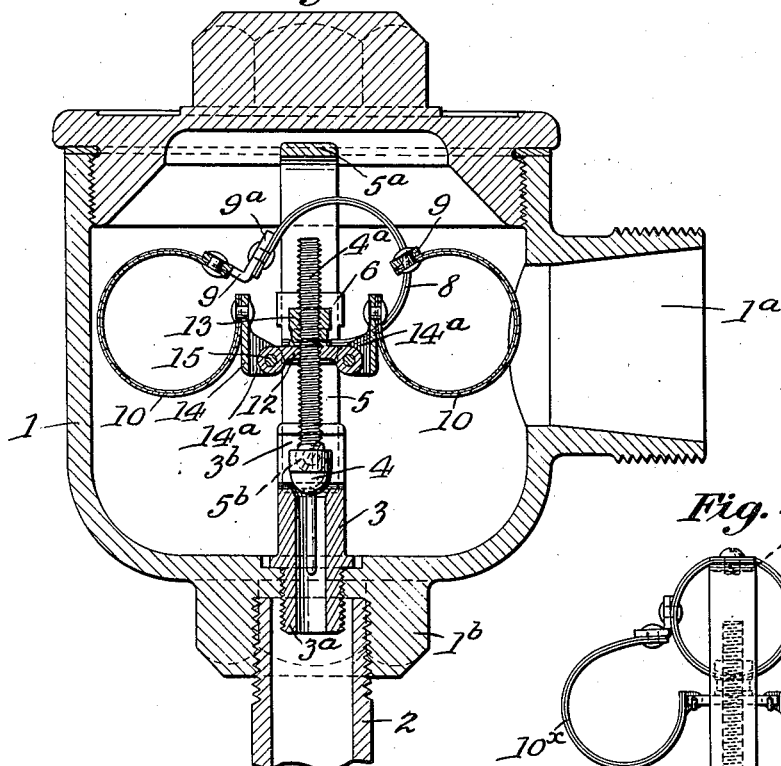
Fig. 1 is a central transverse vertical section through a valve constructed in accordance with my invention.

Referring by reference characters to this drawing, the numeral 1 designates a steam chamber or valve casing having a threaded nipple 1ª, designed to be connected to a steam radiator (not shown) in the manner well understood by those skilled in the art, and having at the bottom a nipple 1ᵇ for connection to the return pipe 2 for the water of condensation. A valve seat member 3 is provided within the valve casing and secured in a suitable manner, such as a threaded nipple connection 3ª as shown in Fig. 1, the valve seat of which is designed to co-operate with the valve 4. The valve seat member is elongated horizontally and the ends are provided with lugs 3ᵇ to which are connected the lower ends of vertical standards 5, which are designed to support the thermostatic valve carrying means in the manner hereinafter described. Preferably the standards are connected at the top by a transverse member 5ª, and the most convenient manner of forming these standards and connecting member is to make them integral and of substantially inverted U-shape, the lower ends of the standards being secured to the ends of the valve seat member in any suitable manner. A desirable form of connection is to provide the ends of the valve seat member with vertical channels in which the ends of the standards are seated, the standards being secured in place by set screws 5ᵇ and the side flanges or walls of the channels serving to relieve the screws of strain.

The standards 5 are provided with bracket members 6, preferably of substantially L-shape, which are adjustably secured to the standards by means of set screws 7 adapted to pass through any one of the plurality of openings 5ᶜ in the standards. Preferably the brackets are of channeled form where they contact with the standards so as to provide side flanges which embrace the sides of the standards and prevent any twisting of the brackets, thereby relieving the holding screws from strain.

These brackets support a pair of curved thermostatic members 8 of substantially circular form, each of said members having one of its ends secured to one of the brackets, and the said members extending from the brackets in reverse directions. The ends of these members may be secured to the brackets in any desired manner, conveniently by set screws as shown. As will be seen from the drawing, the thermostatic springs extend horizontally from the brackets in opposite directions and thence curve upwardly, inwardly and downwardly, so that their free ends lie approximately in inclined planes. To these free ends are rigidly connected angle members 9 having portions 9ª rigidly united to the free ends of the springs by riveting, brazing or both, these angle members 9 extending inwardly into approximate alignment with the valve stem 4ª of the valve 4. The ends 9ᵇ of said inwardly extending portions of the members 9 are rigidly connected by riveting, brazing or both, to the inclined ends of similar thermostatic members 10 which therefore lie in approximate alignment with each other and with the valve stem, and which thermostatic members are curved outwardly, downwardly and upwardly to bring their free ends into proximity to the valve stem and approximately parallel thereto on opposite sides thereof. To the valve stem is adjustably connected a valve carrier 12, the preferred form of adjustable connection being to provide the valve stem with an external screw thread which engages a screw threaded opening in the valve carrier, a lock nut 13 being provided to lock the parts against relative movement. By loosening the lock nut and screwing the valve stem up or down, any desired adjustment relative to its carrier may be readily secured. Lug members 14 are rigidly secured to the free ends of the last named thermostatic springs, which lug members are respectively pivotally connected to the opposite sides of the valve carrier, preferably by providing the lug members with ears 14ª which overlap the sides of the ends of the valve carrier and are provided with openings aligning with openings in the valve carrier, through which pivot pins 15 are passed.

In this form the thermostatic members or springs 8 are composed of laminations of brass and steel with the brass on the outside, while the members 10 comprise similar laminations with the steel on the outside, whereby I incur a differential action.

In the form shown in Figs. 3, 4 and 5 I support the springs 8ˣ from the top horizontal member 5ˣ, and the springs 10ˣ from the free ends thereof by similar bracket members 9ˣ.

In this form I bifurcate the ends of the valve carrier to provide ears x between which the small lugs attached to the free ends of the springs 10ˣ are pivotally secured by pins as shown.

In this form I prefer to make the springs all of correspondingly laminated construction, to wit, all with steel on the outside, thereby incurring a commutative action instead of a differential action.

I also provide for adjustment in this modification by adjustably connecting the lower ends of the standards to the valve seat member by providing the standards with a plurality of holes 5ʸ for the attaching screws.

What I claim is:

1. In a thermostatic valve for the purpose described, a valve casing having a valve seat, a pair of reversely curved thermostatic members located on opposite sides of a plane passing through said valve seat and having rigidly supported ends and free ends, a second pair of reversely curved thermostatic members located in substantial alignment and between said first named members, and having ends rigidly connected with the free ends of said first named members, a valve carrier to which the free ends of said second members are pivotally connected, and a valve adjustably carried by said valve carrier.

2. In a thermostatic valve for the purpose described, a valve casing, a valve seat member therein, a pair of thermostatic springs having ends adjustably supported from said valve seat member and having free ends, a second pair of thermostatic springs having ends rigidly connected with the ends of said first named springs, and having free adjacent ends, a valve carrier having pivotal connection with said free ends, and a valve carried by said carrier.

3. In a thermostatic valve for the purpose described, a valve casing, a valve seat member therein of elongated form having upstanding lugs, standards secured to said lugs, thermostatic springs supported from said standards, a valve carrier connected with said springs, and a valve having a stem adjustably supported by said valve carrier.

4. In a thermostatic valve of the class described, a valve casing and valve seat, standards located on opposite sides of said valve seat, curved thermostatic members located adjacent said standards and having ends connected thereto and free ends, curved thermostatic members located in a plane intermediate the plane of said first named members and having ends rigidly connected to their free ends, and having adjacent free ends, a valve carrier pivotally connected with said adjacent free ends, and a valve adjustably carried by said valve carrier.

5. In a thermostatic valve a valve casing and valve seat, a frame of substantially inverted U-shape within said casing, a double set of curved thermostatic members supported from said frame, a valve carrier supported by said members, and a valve adjustably carried by said carrier.

6. In a thermostatic valve, a valve casing, a valve seat member having a nipple tapped into the outlet of said casing and having a valve seat, said member having lateral extensions provided with channeled ends, standards secured in said channeled ends, thermostatic springs supported by said standards, and a valve adjustably supported from said springs.

7. In a thermostatic valve a valve casing having a valve seat, parallel vertical standards within the casing and supported from the bottom thereof, brackets having channeled sides fitting and secured to said standards, thermostatic springs supported from said standards, and a valve supported by said springs.

In testimony whereof I affix my signature.

JESSE L. FERRIS.